(12) United States Patent
Eberth et al.

(10) Patent No.: US 8,695,923 B2
(45) Date of Patent: Apr. 15, 2014

(54) WINDOW REPLACEMENT FOR FILLING A WINDOW FRAME

(75) Inventors: Ulrich Eberth, Rain (DE); Mario Koeber, Oederan (DE)

(73) Assignee: Airbus Operations GmbH, Hamburg (DE)

( * ) Notice: Subject to any disclaimer, the term of this patent is extended or adjusted under 35 U.S.C. 154(b) by 689 days.

(21) Appl. No.: 11/900,685

(22) Filed: Sep. 13, 2007

(65) Prior Publication Data

US 2008/0067288 A1 Mar. 20, 2008

(30) Foreign Application Priority Data

Sep. 20, 2006 (DE) .......................... 10 2006 044 093

(51) Int. Cl.
*B64C 1/14* (2006.01)
(52) U.S. Cl.
USPC .................. 244/129.3; 244/129.1; 52/208
(58) Field of Classification Search
USPC .............. 244/129.3, 129.4, 129.1; 52/786.11, 52/786.12, 786.13, 208; 428/116–118
See application file for complete search history.

(56) References Cited

U.S. PATENT DOCUMENTS

| | | | |
|---|---|---|---|
| 3,691,686 A | 9/1972 | Donegan | |
| 3,906,669 A | 9/1975 | Vorguitch | |
| 4,456,092 A * | 6/1984 | Kubozuka et al. | ............ 181/290 |
| 4,487,449 A | 12/1984 | Igel et al. | |
| 4,793,108 A | 12/1988 | Bain et al. | |
| 4,908,254 A * | 3/1990 | Fischer et al. | ................ 428/119 |
| 5,027,569 A | 7/1991 | Keys | |
| 5,918,430 A | 7/1999 | Rowland | |
| 6,029,933 A | 2/2000 | Holman et al. | |
| 6,047,925 A | 4/2000 | Rivera et al. | |
| 6,129,311 A * | 10/2000 | Welch et al. | ............. 244/117 R |
| 6,435,455 B1 | 8/2002 | Holman et al. | |
| 6,706,370 B1 * | 3/2004 | Ito et al. | ......................... 428/174 |
| 6,743,497 B2 | 6/2004 | Ueda et al. | |
| 7,028,950 B2 * | 4/2006 | Salmon et al. | ............. 244/129.3 |
| 7,121,315 B2 * | 10/2006 | Ly | ................................. 160/105 |
| 7,210,655 B2 * | 5/2007 | Novak et al. | .................. 244/119 |
| 2002/0012767 A1 | 1/2002 | Ueda et al. | |
| 2003/0234322 A1 | 12/2003 | Bladt et al. | |

(Continued)

FOREIGN PATENT DOCUMENTS

| | | |
|---|---|---|
| EP | 0 089 337 | 9/1983 |
| EP | 0 287 692 | 10/1988 |
| WO | WO 8301237 A1 | 4/1983 |

OTHER PUBLICATIONS www.liteair.com.*
Office Action with Restriction/Election Requirement for U.S. Appl. No. 13/084,110 dated Feb. 27, 2012.
Non-Final Office Action for U.S. Appl. No. 13/084,110 dated May 17, 2012.
Final Office Action for U.S. Appl. No. 13/084,110 dated Oct. 19, 2012.
Notice of Allowance for U.S. Appl. No. 13/084,110 dated May 28, 2013.

*Primary Examiner* — Joseph W Sanderson
(74) *Attorney, Agent, or Firm* — Jenkin, Wilson, Taylor & Hunt, P.A.

(57) ABSTRACT

A window replacement for filling a window frame in an aircraft is provided, in particular a passenger aircraft, the window replacement being fixable by a retainer in the window frame in place of the window assembly when the window assembly is removed. The window replacement includes a panel-shaped element with at least a single curvature, the panel-shaped element being made of a synthetic material. The window replacement is formed by a monolithic panel-shaped element. The panel-shaped element of the window replacement may also be formed by a sandwich panel. This allows a weight reduction in comparison with a window replacement of a metallic material.

2 Claims, 2 Drawing Sheets

(56) References Cited

U.S. PATENT DOCUMENTS

| | | |
|---|---|---|
| 2005/0082432 A1 | 4/2005 | Nordman |
| 2005/0136761 A1* | 6/2005 | Murakami et al. ............... 442/59 |
| 2006/0192051 A1* | 8/2006 | Novak et al. .................. 244/119 |
| 2006/0248853 A1 | 11/2006 | Bartley-Cho et al. |
| 2008/0078494 A1* | 4/2008 | Nordman ...................... 156/168 |
| 2008/0271857 A1* | 11/2008 | Swadling ...................... 160/179 |
| 2011/0018664 A1 | 8/2011 | Eberth et al. |

* cited by examiner

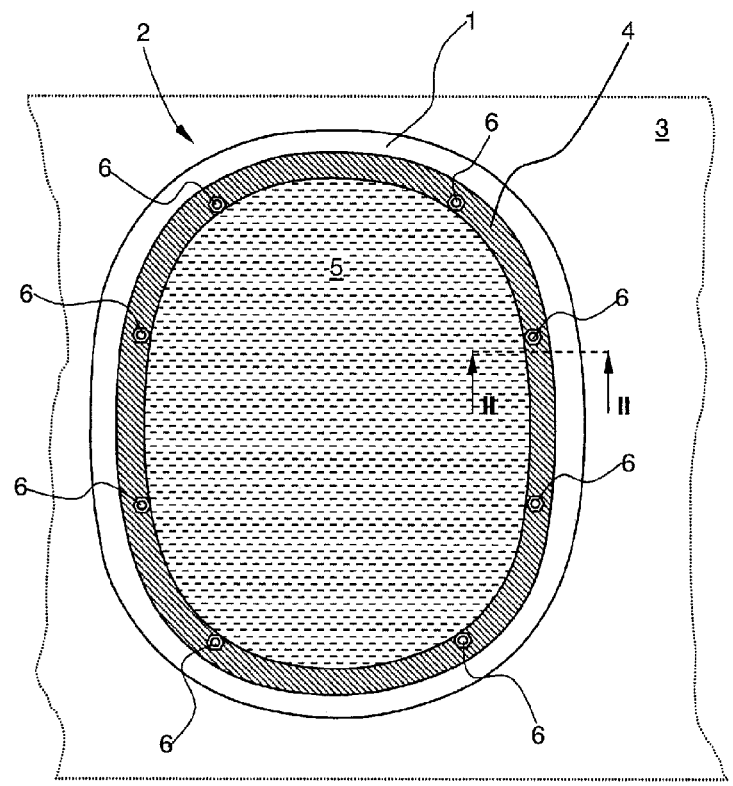
PRIOR ART  Fig. 1
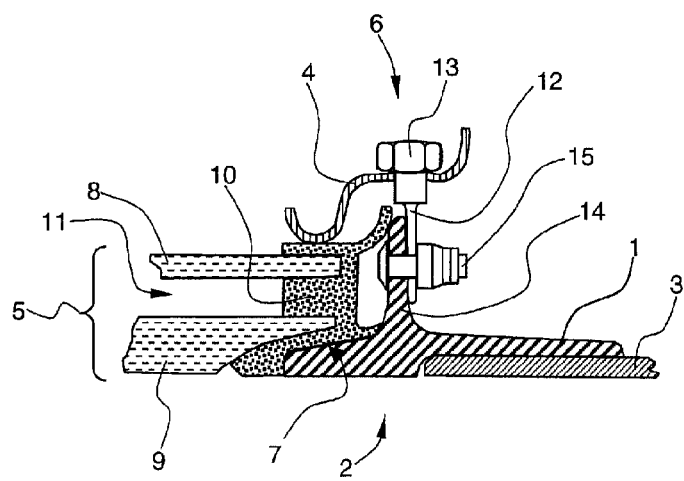
PRIOR ART  Fig. 2

WINDOW REPLACEMENT FOR FILLING A WINDOW FRAME

CROSS-REFERENCE TO RELATED APPLICATIONS

This application claims the benefit of German Patent Application No. 10 2006 044 093.5 filed on Sep. 20, 2006, the complete disclosure of which is herein incorporated by reference.

FIELD OF THE INVENTION

The invention relates to a window replacement for filling a window frame in an aircraft, in particular a passenger aircraft, the window replacement being fixable by means of a retainer in the window frame in place of the window assembly when the window assembly is removed.

BACKGROUND OF THE INVENTION

On account of the increases in the air freight market, a trebling of the volume of freight is expected over the next 20 years, which in turn will create a demand for approximately 3000 further freight aircraft. Since only few freight aircraft companies buy new freight aircraft from the manufacturers, by far the majority of all freight aircraft are converted passenger aircraft. During the conversion, the core is taken out of the passenger aircraft and all fixtures and fittings necessary for passenger service, such as the galley and panellings, are removed. A large cutout for the freight door is made in the fuselage, the bottom of the cabin is reinforced and the windows are closed by metal covers.

During the conversion to the freight version, the first step taken in the area of the windows of the passenger aircraft is to remove the window retainers and then take out the transparent interior and exterior window panes together with the window seal, known as the window assembly. The actual window frame, which serves for reinforcing the fuselage structure in the area of the window frame and takes up all the structural loads, remains in place.

The replacement of the windows by metal covers means additional weight, causing losses in payload of several tonnes in comparison with freight aircraft that are already supplied ex works without windows. This results in considerable extra costs over the remaining lifetime of the converted aircraft, which can be at least partly compensated by means of the window replacement according to the invention.

SUMMARY OF THE INVENTION

The object of the invention is to avoid the disadvantages described above of the known closure cover for window frames of passenger aircraft.

The object is achieved by a window replacement for filling a window frame in a passenger aircraft, the panel-shaped window frame cover being fixable by a window frame retainer in the window frame in place of a window assembly when the window assembly is removed, wherein the panel-shaped window frame cover has at least one convex curvature and being of a monolithic form and being made of a curable carbon fiber reinforced synthetic material.

The fact that the window replacement is formed by a panel-shaped element with at least a single curvature, with the panel-shaped element being formed from a synthetic material, allows the existing losses in payload in the conversion of passenger aircraft into freight aircraft to be reduced. One reason for the weight advantage in this case is the much lower density of the composite material of the novel window replacement in comparison with metal, combined with its outstanding specific strength and rigidity values.

In a first configurational variant ("monolithic window replacement"), the window replacement is formed by a panel-shaped element of a carbon fiber reinforced curable epoxy resin that is curved at least once. The outer contour of the panel-shaped element corresponds substantially to the outer contour of the window assembly fitted as standard in the window frame. The panel-shaped element may be formed with a single or double curvature (spherical), in order to achieve optimum adaptation to the local curvature of the aircraft fuselage in the window area. In comparison with the thickness of the window assembly, the window replacement in this configurational variant may have a lower thickness, so that it may be necessary for the cross-sectional geometry of a peripheral seal and/or the shaping of the retainer to be modified slightly in comparison with the sealing system of the window assembly and of the retainer used for fixing the window assembly to allow the window replacement to be used.

In the first configurational variant of the window replacement, production is performed with preference by means of a continuous production process, for example with a preimpregnated web material ("CRP prepreg material") of a curable carbon fiber reinforced epoxy resin. The web material already has the required layer structure, the suitable layer orientation and the correct material thickness. Before the final curing process, first the panel-shaped element is removed from the endless web material, for example by cutting out or punching out two-dimensional pieces of an appropriate geometry. At least the edge contour of the panel-shaped elements corresponds approximately to the window assemblies to be replaced. The required further geometrical formation of the monolithic window replacement, in particular the adaptation to different local curvatures of the aircraft fuselage, can be performed before the curing process or during the curing process. It may be that thickenings are also effected in the area of the edge contour of the window replacement before the curing process, to provide edge reinforcement and thickness adaptation of the panel-shaped elements. After the completion of the curing process, the peripheral seal is pulled onto the panel-shaped element to form the finished monolithic window replacement.

Alternatively, fiber reinforced thermoplastic materials may also be used for producing the monolithic window replacement.

By contrast with the first configurational variant, in a second configurational variant the panel-shaped element of the window replacement is formed as a sandwich panel, which likewise has at least a single curvature, in order to permit adaptation to the curved outer skin of the fuselage or to the window frame. The sandwich panel has the usual construction with a core structure, preferably a core structure capable of allowing drainage, arranged between two outer layers.

The interior window pane and the exterior window pane of the window assembly are in this case reproduced or replaced by the interior outer layer and the exterior outer layer of the sandwich panel, and the function of the space between the interior window pane and the exterior window pane is undertaken by the core structure arranged between the interior and exterior outer layers of the sandwich panel.

This configurational variant has the advantage in particular that the window replacement has approximately the same dimensions or the same geometrical shapes as a window assembly that is usually fitted in the window frame. Consequently, the window replacement in accordance with the second configurational variant can be fitted in a simple manner directly in the existing window frame without any further structural modifications, in particular to the retainer and/or to a peripheral seal.

In addition, there is a further weight saving in comparison with the monolithic embodiment, with the same or even to some extent further improved mechanical properties.

Since, in a way corresponding to the window assembly, the window replacement according to both configurational variants does not have to take up any additional loads apart from the internal cabin pressure—these loads of the fuselage structure are generally taken up by the window frame—the window replacement in both configurational variants can be of a relatively simple construction, that is to say there is no need to provide any special layer structure and/or fiber orientation that is optimized in terms of stress transmission or distribution in the monolithic window replacement or in the sandwich panel.

A refinement of the window replacement provides that it is surrounded by a peripheral seal.

As a result, the sealing effect of the window replacement is enhanced and at the same time a firm fit of the window replacement is ensured.

An advantageous refinement of the window replacement provides that the panel-shaped element is of a monolithic form and the synthetic material is fiber-reinforced.

The fiber reinforcement achieves a higher mechanical load-bearing capacity of the window replacement. The monolithic form of the panel-shaped element additionally makes it possible for it to be easily produced, for example from a "CRP prepreg material" in web form of a suitable layer structure, in a continuous and therefore low-cost production process.

In accordance with a further advantageous refinement, it is provided that the synthetic material is a curable carbon fiber reinforced epoxy resin. This refinement allows a higher mechanical strength of the window replacement in comparison with other fiber composite materials.

A further development provides that the window replacement is formed by a sandwich panel which has a core structure that is arranged between an interior outer layer and an exterior outer layer.

As a result, the window replacement does not require any structural modifications to the peripheral seal and/or the retainer of the window frame or the window assembly, so that it is possible for it simply to take the place of a window assembly fitted in the usual way in the window frame. Moreover, the heat insulating capacity of the window replacement in comparison with the monolithic embodiment is improved to such an extent that under some circumstances it matches the heat insulating capacity of a window assembly.

In accordance with a further advantageous refinement, it is provided that the core structure is capable of drainage.

As a result, condensed water within the sandwich panel is drained away. This avoids any mechanical impairment of the integrity of the core structure of the sandwich panel, for example by condensate freezing.

A further advantageous refinement provides that the core structure is a folded honeycomb structure or a slit honeycomb structure.

This refinement permits an adequately high compressive strength of the core structure arranged between the exterior outer layer and the interior outer layer of the sandwich panel to ensure its spacing function, while at the same time water condensing within the core structure can be drained away to the outside.

A further advantageous embodiment of the window replacement provides that the core structure is formed from a closed-cell rigid foam.

This achieves the effect of joining the interior outer layer and the exterior outer layer to the core structure formed from the closed-cell rigid foam by a connection that is simple and at the same time can withstand mechanical loading. The closed-cell structure of the rigid foam prevents, or at least hinders, the ingress of water, for example in the form of condensed water. An open-cell rigid foam on the other hand—by contrast with a core structure with cells of large volume that is capable of drainage—would be undesirably conducive to the ingress of water on account of the capillary forces occurring.

Further advantageous refinements of the window replacement are set out herein.

BRIEF DESCRIPTION OF THE DRAWINGS

In the drawings:

FIG. 1 shows a schematic inner view of a window in a passenger aircraft,

FIG. 2 shows a cross section along the sectional line II-II through the window frame in accordance with FIG. 1.

In the drawings, the same structural elements in each case have the same reference numerals.

DETAILED DESCRIPTION OF THE INVENTION

Figure 3:
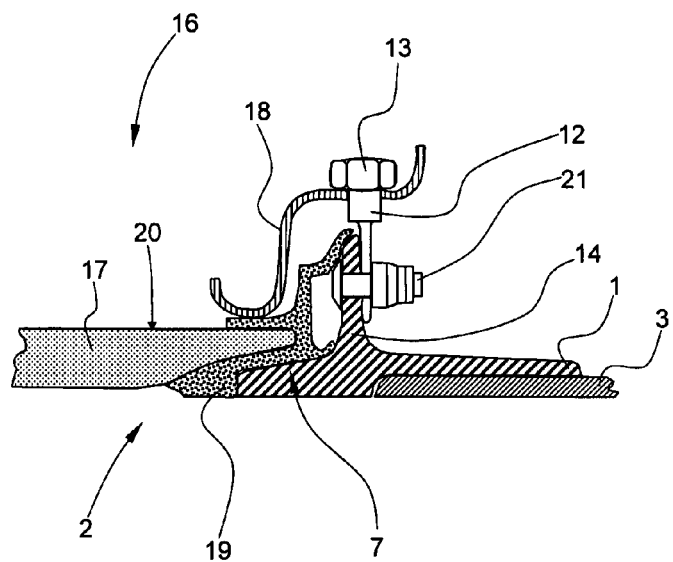
FIG. 3 shows a cross section through the window frame with a fitted first configurational variant of a window replacement according to the invention.

FIG. 1 shows a schematic inner view of a window usually fitted in a passenger aircraft, with a window frame and a window assembly.

A window frame 1 is fixed in the area of a window opening 2 to an outer skin 3 of the fuselage of a passenger aircraft, for example being riveted or adhesively bonded to it. By means of a retainer 4, a window assembly 5 is pressed into the window frame 1, in order to ensure a firm and, in particular, pressure-sealed fit of the window assembly 5 in the window frame 1. In the exemplary embodiment shown, the connection between the retainer 4 and the window frame 1 is achieved by a total of eight fastening elements 6.

FIG. 2 shows a schematic cross section through a window frame that is usually used for passenger aircraft, according to FIG. 1, along the sectional line II-II.

The window assembly 5 is pressed by means of the retainer 4 onto a slightly conical bearing surface 7 of the window frame 1. As a result of the conicity of the bearing surface 7, the window assembly 5 centres itself of its own accord in the window frame. The window frame 1 is firmly connected to the outer skin 3 of the fuselage by means of fastening elements (not represented), for example in the form of rivets. The window assembly 5 comprises an interior window pane 8 with an exterior window pane 9 arranged parallel to it with a spacing in between, which are enclosed by a peripheral seal 10. To receive the interior window pane 8 and the exterior window pane 9, the seal 10 has two peripheral inner grooves or inwardly directed recesses. Between the interior window pane 8 and the exterior window pane 9 there is an air-filled intermediate space 11. Air is admitted to the intermediate space 11 from the passenger cabin, in order to prevent icing of any condensate that may be deposited. The fastening element 6 comprises an eye bolt 12 and a nut 13 that can be screwed onto it. A vertical web 14 of the window frame 1 also has a bore for leading through a cross bolt 15. By tightening the nut 13, the retainer 4, the window assembly 5 and the window frame 1 are braced with respect to one another. The configuration of the other seven fastening elements corresponds to the construction described above of the fastening element 6.

FIG. 3 shows a cross section through a window frame with a fitted first configurational variant of a window replacement.

The window frame 1 is firmly connected to the outer skin 3 of the fuselage in the area of the window opening 2. The web 14 of the window frame 1 and the cross bolt 15 are structurally unchanged in relation to the described embodiment in accordance with FIG. 2.

The window replacement 16 is formed by a monolithic panel-shaped element 17. The panel-shaped element 17 has at least a single curvature, which corresponds approximately to the respective local curvature of the outer skin 3 of the fuselage. On account of the smaller material thickness of the panel-shaped element 17 in comparison with the overall height of the window assembly 5, a retainer 18 has a greater height in comparison with the retainer 4 represented in FIG. 2. A likewise modified peripheral seal 19 surrounds the panel-shaped element 17. By contrast with the seal 10 described in FIG. 2, the seal 19 has just one peripheral recess or groove for receiving an edge of the panel-shaped-element 17 and a correspondingly lower overall height in comparison with the seal 10. The fixing of the window replacement 16 or the panel-shaped element 17 in the window frame 1 or on the conical bearing surface 7 is performed in a known way by means of the eye bolt 12 and the nut 13 and by means of the cross bolt 15 arranged in the area of the web 14 of the window frame 1. An inner surface 20 of the panel-shaped element 17 may also have reinforcing elements (not represented), for example in the form of ribs or beads.

The panel-shaped element 17 is formed for example from a curable fiber reinforced synthetic material, for example from a carbon fiber reinforced epoxy resin. The production of the window replacement 16 or the panel-shaped element 17 may be performed continuously in large numbers, for example by means of a CRP "prepreg" material in web form of the required material thickness and fiber orientation. Before or during the curing of the panel-shaped element 17 that is cut or punched out from the web material, or removed from the web material in some other way, it may be adapted to the respective local curvature of the outer skin 3 of the fuselage. The panel-shaped element 17 may be curved once or twice (spherical). The material thickness of the monolithic panel-shaped element 17 is preferably up to 5 mm.

Figure 4:
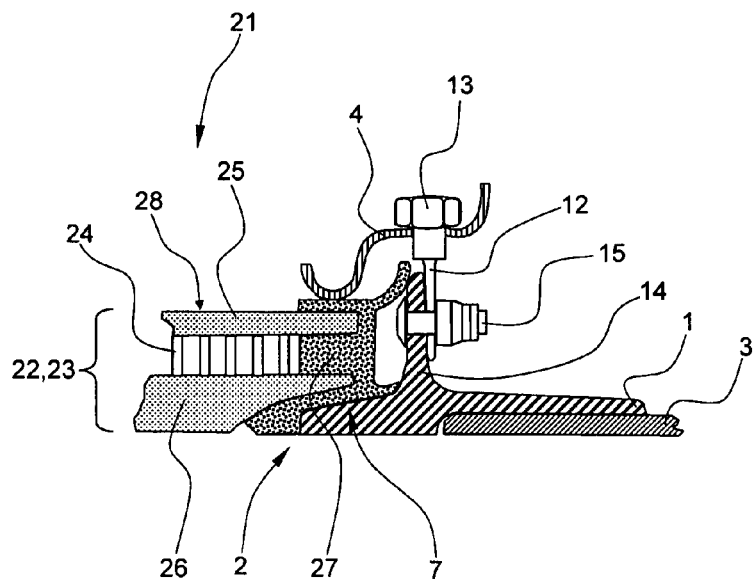
FIG. 4 shows a second configurational variant of the window replacement.

FIG. 4 shows a second configurational variant of the window replacement.

As a difference from the first configurational variant, a window replacement 21 with a sandwich panel 22 is formed as the panel-shaped element 23. The sandwich panel 22 has a core structure 24, which is provided on either side with an interior outer layer 25 and an exterior outer layer 26. Here, the dimensions or the shape of the interior and exterior outer layers 25, 26 coincide substantially identically with those of the interior and exterior window panes 8, 9 of the window assembly 5. Therefore, it is easily possible for the window replacement 21 to take the place of the window assembly 5. The seal 10 described in FIG. 2 can also (continue to) be used unchanged with the window replacement 21. To make this possible, the core structure 24 of the sandwich panel 22 has with preference a material thickness that corresponds approximately to a spacing between the interior window pane 8 and the exterior window pane 9 of the conventional window assembly 5 or the spacing of the interior space 11. In a way corresponding to the window assembly 5, the interior outer layer 25 and the exterior outer layer 26 are enclosed or bordered by a peripheral seal 27. The cross-sectional geometry of the seal 27 corresponds substantially to the cross-sectional geometry of the seal 10 of the window assembly 5 (cf. FIG. 2), so that the window assembly 5 can be exchanged for the window replacement 21 without any appreciable structural modifications. In a way corresponding to the window assembly 5, the window replacement 21 in the fitted state lies against the conical bearing surface 7 of the window frame 1. In principle, it would be possible to continue to use the old seal 10 of the window assembly 5 for the window replacement 21, but in practice the window replacement 21 is generally provided with a brand-new seal 27 for safety reasons.

The interior and exterior outer layers 25, 26 are formed from a fiber reinforced, curable synthetic material, in particular with a carbon reinforced epoxy resin. The core structure 24 may be formed, for example, in a known way from Nomex® paper or from aluminium honeycombs. The material thicknesses of the interior and exterior outer layers 25, 26 correspond approximately to the corresponding thicknesses of the interior and exterior window panes 8, 9 that are usually used in the window assembly 5.

Moreover, the core structure 24 is capable of drainage, that is to say the core structure 24 is formed in particular from a folded honeycomb or from a slit honeycomb. As a result, the draining away of any condensate that may form in the area of the core structure 24 is ensured and freezing of the same is prevented. The configuration of the window replacement 21 with the sandwich panel 22 leads to a heat insulating capacity that is comparable with the window assembly 5 usually fitted in a window frame 1 and furthermore leads to reduced weight in comparison with the monolithic embodiment (cf. FIG. 3). An inner surface 28 of the panel-shaped element 23 may also have reinforcing elements (not represented), for example in the form of ribs or beads.

The second configurational variant of the window replacement 21, represented in FIG. 4, can consequently take the place directly of the window assembly 5 without any structural modifications of the fastening means, in particular of the retainer 4, the eye bolt 12, the nut 13, the web 14 and the cross bolt 15.

The first configurational variant has a simpler construction in comparison with the second configurational variant of the window replacement 21. In addition, the first configurational variant of the window replacement 16 makes it possible for it to be produced easily and at low cost, in particular by means of continuous production processes. However, the window replacement 16 in accordance with the first configurational variant does not have the heat insulating capacity of the window replacement 21 in accordance with, the second configurational variant, which is achieved in particular by the sandwich structure. In addition, the first configurational variant has a lower mass in relation to the second configurational variant of the window replacement 21 with the sandwich panel 22.

However, neither of the two configurational variants of, the window replacement 16, 21 have to meet increased mechanical requirements, since only the forces caused by the increased cabin pressure have to be taken up. All the structural fuselage loads are borne by the window frame 1 and directed away via the window opening 2, so that in particular there is no need for a reinforcing fiber orientation based on stress transmission or distribution and/or a specific layer sequence of the reinforcing fabrics that are used.

Both variants of the window replacement are opaque to visible light and to electromagnetic radiation in the near and far infrared ranges, in order inter alia to make it impossible to see into the space inside the aircraft from the outside.

LIST OF REFERENCE NUMERALS 1 window frame
2 window opening
3 outer skin of fuselage
4 retainer
5 window assembly
6 fastening element
7 conical bearing surface
8 interior window pane
9 exterior window pane
10 seal
11 intermediate space
12 eye bolt
13 nut
14 web
15 cross bolt
16 window replacement
17 panel-shaped element
18 retainer
19 seal
20 inner surface
21 window replacement
22 sandwich panel
23 panel-shaped element
24 core structure
25 interior outer layer
26 exterior outer layer
27 seal
28 inner surface

What is claimed is:

1. A window replacement assembly for filling a window frame in an aircraft, the window replacement assembly being fixable by a retainer in the window frame in place of a window assembly when the window assembly is removed, wherein the window replacement assembly is pressed by the retainer onto a slightly conical bearing surface, the retainer being fastened by a fastening element, the fastening element comprising an eye-bolt and a nut screwed onto the eye-bolt, and wherein the window replacement assembly comprises a panel-shaped element with at least a single curvature, with the panel-shaped element being made of a synthetic material and the panel-shaped element being of a monolithic form, the panel-shaped element being enclosed by a peripheral seal, the peripheral seal having a peripheral inner groove for accommodating the panel-shaped element.

2. The window replacement assembly according to claim 1, wherein the window replacement assembly is an aircraft window replacement assembly.

* * * * *